Dec. 15, 1959   L. C. OAKES ET AL   2,917,445
NEUTRONIC REACTOR CONTROL ROD DRIVE APPARATUS
Filed Aug. 7, 1956   2 Sheets-Sheet 1

INVENTORS
Lester C. Oakes &
Clinton S. Walker
BY
*Roland G. Anderson*
ATTORNEY

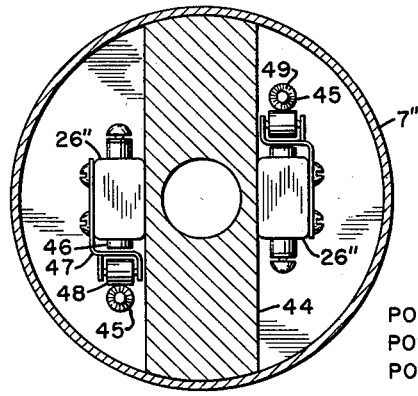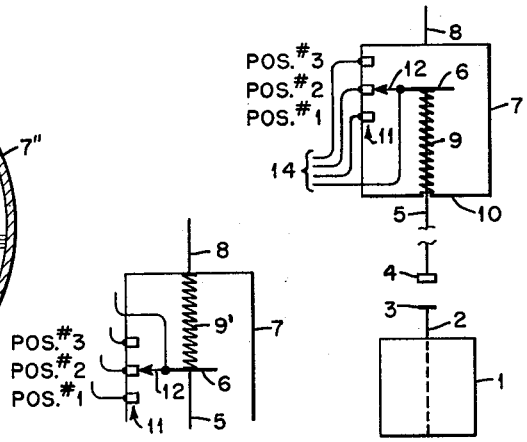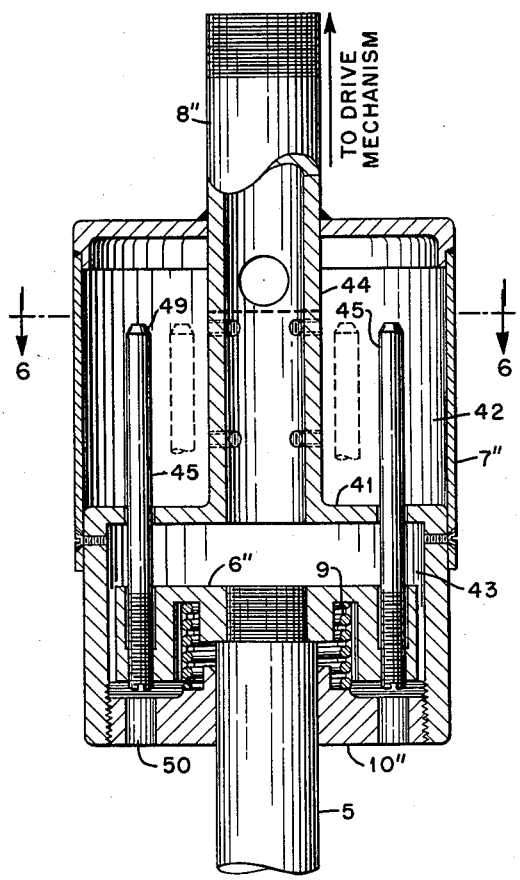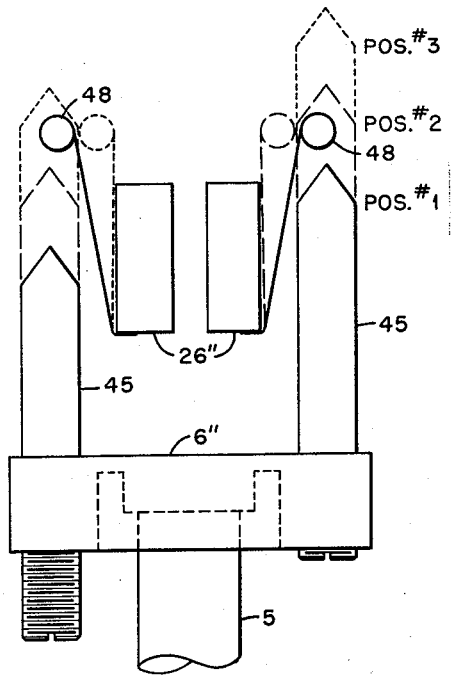
Fig. 6.
Fig. 9.
Fig. 8.
Fig. 5.
Fig. 7.
INVENTORS
Lester C. Oakes &
Clinton S. Walker
BY
ATTORNEY United States Patent Office  2,917,445
Patented Dec. 15, 1959

2,917,445

NEUTRONIC REACTOR CONTROL ROD DRIVE APPARATUS

Lester C. Oakes, Knoxville, and Clinton S. Walker, Oak Ridge, Tenn., assignors to the United States of America as represented by the United States Atomic Energy Commission Application August 7, 1956, Serial No. 602,680

2 Claims. (Cl. 204—193.2)

The present invention relates generally to neutronic reactor control rod supporting and driving apparatus, and more particularly, to improvements in such apparatus adapted to provide reliable and accurate information as to the position and operative condition of the control rod and its associated driving mechanism.

As is well known, many types of reactors, for example, the materials testing reactor described by J. R. Huffman in the April 1954 issue of "Nucleonics," vol. 12, No. 4, are controlled by means of vertically elongated rigid control rods, the position of which vertically of the reactor is externally controlled. In Figure 2, page 22, of that publication a sectional elevation of a reactor is shown with the active portion located in section D, the control rod (shim rod) located in section C, the magnetic clutch for joining the shim rod to the drive rod located in section B, the drive rod shown in section A, and the drive mechanism for raising and lowering the drive rod is located above the tank section, section A. Such a control rod conventionally terminates at its top in an electromagnet armature by means of which the control rod is releasably coupled to a rigid vertically extending control rod extension which terminates at its bottom in a co-operating electromagnet winding housing. When the control rod and extension are not connected, the control rod is supported in a fixed lowermost position in the reactor by the reactor structure. When the control rod and extension are connected, the two move as a vertically elongated unit extending well above the reactor core. A suitable motor or other driving means, mounted well above the reactor core, is conventionally connected to actuate the control rod extension whereby the vertical position of the control rod in the reactor core can be controlled.

In many reactors using the above described control rod system, such as in the materials testing reactor, the reactor is cooled (and partially shielded) by water which forms a reservoir extending some distance above the reactor and which flows downwardly through vertical channels in the reactor. In such a case, the control rod extension passes all the way through the water reservoir to the motor or other drive mechanism which is located above the water. The electromagnetic coupling is located in the water close to the active portion or core of the reactor proper, thereby permitting the control rod itself to be of minimum vertical dimensions, which in turn, minimizes its weight and reduces the need for numerous guide bearings for the control rod.

In the operation of a reactor having the above described control system, it is essential to provide absolutely reliable information as to the operative relationship between the control rod and its extension. Specifically, it is essential for the operator (or an automatic control system) to know, without chance of error, which of the three possible conditions obtains at all times: (1) the control rod extension engaged with and supporting the control rod; (2) the control rod extension disengaged from the control rod; and (3) the control rod extension engaged with the control rod while the latter is in its lowermost position, both control rod and extension being supported by the reactor structure.

Prior art methods for providing information as to the operative condition of control rod and extension have not been entirely satisfactory. One prior art method for indicating engagement of control rod and extension was to make these two elements, themselves, part of a series electrical circuit. This, however, necessitated insulation of parts and also was not very satisfactory due to variation of electrical resistance at the point of contact as a result of wear and corrosion due to the water environment. Another prior art method involved the installation on the electromagnet housing of a switch which was physically actuated by engagement of the armature. Here again, corrosion and electrolytic action of the water often caused failures of one kind or another.

The object of the invention, therefore, was to provide a control rod drive system adapted to provide reliable and accurate information as to the operative relationship between the control rod and its extension.

In accordance with the principles of the present invention, applicants accomplish the above stated object by interposing a spring connection between the control rod extension and the actual driving mechanism. Instead of the extension being driven directly by the driving mechanism, the extension is supported by spring means from a vertically movable drive shaft which, in turn, is directly actuated by the driving mechanism. Under the three different possible operative conditions, the load upon the spring interconnection varies, and therefore the vertical position of the extension relative to the drive shaft varies. The vertical position of the extension with respect to the drive shaft at any given time is thus an indication of the current operative relationship between the control rod and its extension. Relative movement of the extension and the drive shaft is used to actuate electrical switching means, whereby the desired information can be electrically transmitted to the operator, or to an automatic control system. In effect, the load upon the drive shaft is spring weighed to see whether the load is made up of: (1) both the extension and the control rod, (2) the extension alone, or (3) neither the extension or control rod. Since the spring interconnection, and the switching means actuated thereby, can be located at the top of the control rod extension well above the cooling water, none of the prior art difficulties arising from exposure of the electrical switching means to water is experienced.

The principles of operation of the invention, as well as other objects and advantages, will become more apparent from the following description when taken in connection with the accompanying drawings, wherein:

Figure 5 is a vertical cross sectional view of another working embodiment of the invention;

Figure 6 is a sectional view taken along the lines 6—6 of Figure 5;

Figure 7 is a schematic representation of the actuation of the switching means under each of the three possible operative conditions of the Figure 5 embodiment;

Figure 8 is a schematic diagram illustrating the broad principles of the invention; and Figure 9 is a schematic diagram showing a modification of Figure 8.

Figure 2:
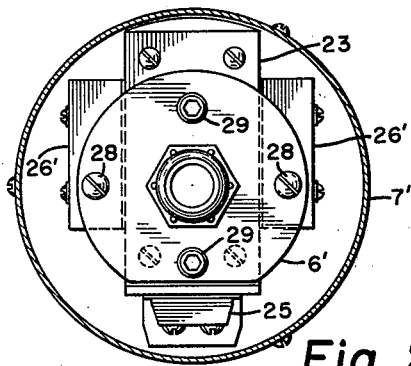
Figure 2 is a sectional view taken along the lines 2—2 of Figure 1.
Figure 3:
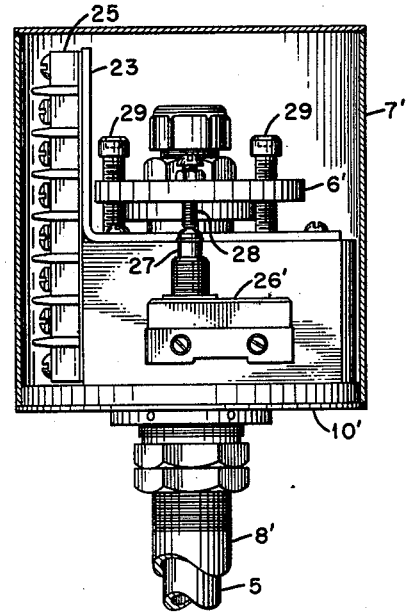
Figure 3 is a sectional view taken along the lines 3—3 of Figure 1.
Figure 1:
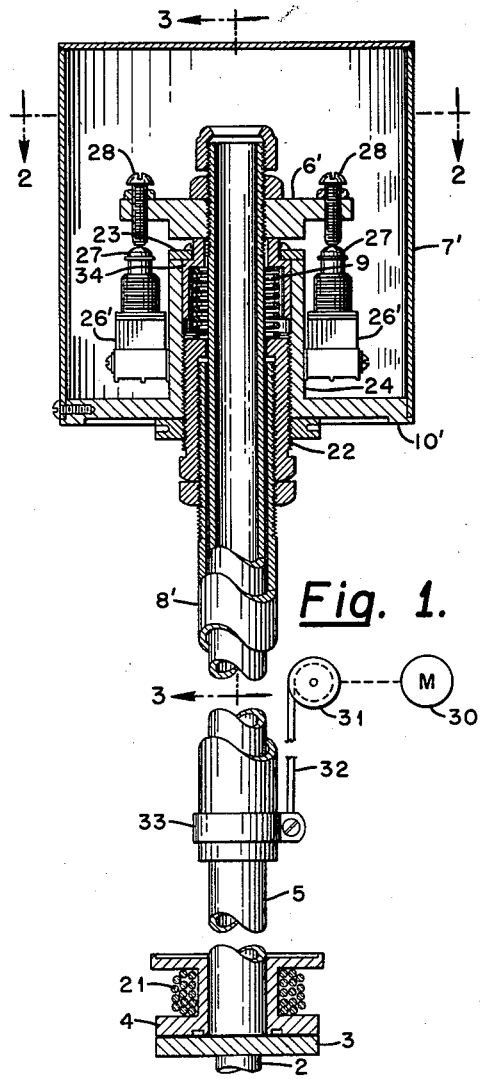
Figure 1 is a vertical cross sectional view of one working embodiment of the invention.

Referring first to Figure 8, reference numeral 1 designates a neutronic reactor active portion or core having a rigid vertically extending control rod 2 adapted to be moved vertically of the core to control the reactor. The control rod 2 is shown in Figure 8 in its lowermost (minimum reactivity) position wherein it rests upon and receives its sole support from the reactor structure.

The control rod 2 terminates at its top in an armature 3 which, together with an electromagnet finding contained in a housing 4 located at the bottom of a control rod extension 5, forms a releasable electromagnetic coupling between the control rod 2 and the extension 5. The control rod extension 5 terminates at its top in a switch actuator plate 6 located within, but movable vertically with respect to, a switch housing 7. The switch housing is attached to the bottom of a vertically movable drive shaft 8 to be movable therewith. The vertical position of drive shaft 8 will be understood to be controllable by suitable driving mechanism, such as a motor and rack and pinion arrangement (not shown).

A compression spring 9 is interposed between the switch actuator plate 6 and the bottom plate 10 of the switch housing 7, the bottom plate 10 having a central aperture through which the control rod extension 5 passes. The actuator plate 6 and the control rod extension 5 are thus urged upwardly with respect to the switch housing 7 and the drive shaft 8.

The switching means is illustrated as comprising a three position electrical switch having three terminals 11, supported by and movable with the switch housing 7, and a contact element 12 attached to and movable with the switch actuator plate 6. Leads 14 are led out from the three terminals 11 and from the contact element 12 to an external circuit adapted to provide information as to the current operative relationship between control rod 2 and its extension 5 depending upon the current position of the switching means.

Whenever, during operation, the control rod extension 5 is disengaged from the control rod 2 so that the control rod is being supported by the reactor structure (the operative condition illustrated in Figure 8), the load upon spring 9, consisting solely of the weight of extension 5, is such that switching element 12 is in contact with the central one of terminals 11, that is, the switching means assumes the position shown, designated as its No. 2 position. Now, as the drive shaft 8 is driven downwardly, the control rod extension 5 eventually engages the control rod 2, and since the control rod 2 cannot move downwardly, the load upon the spring represented by the weight of extension 5 is removed. Under such no load operative condition, with both control rod and extension supported by the reactor structure, the switching means assumes its No. 3 position. If the winding of the electromagnetic coupling is then actuated and the drive shaft 8 is driven upwardly, the extension 5 and control rod 2 move upwardly as a unit, the load upon the spring 9 then consisting of the sum of the weights of the extension and the control rod. Under such operative condition, the switching means assumes its No. 1 position.

Figure 9 illustrates how a tension spring 9', instead of the compression spring 9 of Figure 8, could be employed. In this case, the top of the spring 9' is connected to the switch housing 7 instead of to the switch actuator plate 6, and the bottom of the spring 9' is connected to the actuator plate 6 instead of to the switch housing 7. The operation of the Figure 9 modification is otherwise exactly the same as the Figure 8 modification, the same numbered positions of the switching means corresponding to the same operative conditions in the two modifications.

Figures 1–4 and Figures 5–7 illustrate, respectively, two specific working embodiments of the invention. In both of these embodiments, the switching means consists of a pair of commercial microswitches instead of the single three position electrical switch shown in Figure 8. Both of these embodiments employ the compression spring 9 of Figure 8 rather than the tension spring 9' of Figure 9. In the Figures 1–4 embodiment, the switch housing is attached to the top, rather than to the bottom, of the drive shaft, and the drive shaft constitutes a hollow shaft surrounding and coaxial with the control rod extension. Otherwise these two specific embodiments correspond in structure with the schematic representation of Figure 8, the principles of operation being identical in all cases.

Referring now specifically to Figures 1–4, the electromagnet armature 3 at the top of control rod 2 is shown as being engaged with and held by the housing 4 of the electromagnet winding 21, the winding housing being fixedly attached to the lower end of the control rod extension 5.

The drive arrangement, in this case, comprises a hollow shaft surrounding, and journalled for vertical sliding movement with respect to, the control rod extension 5. A spring adjusting sleeve 22 is screw threaded onto the top of the drive shaft 8', and a hollow re-entrant portion 24 of the bottom plate 10, of the hollow switch housing 7' is, in turn, screw threaded onto the sleeve 22. The switch housing 7' is thus fixedly attached to the top of the drive shaft 8' for vertical movement therewith. The vertical position of the drive shaft 8' is shown as controllable by a drive motor 30 which drives a pulley wheel 31 to which is attached a drive cable 32, which cable is, in turn, connected to a collar 33 rigidly attached to the drive shaft 8'.

Fixedly attached to the hollow re-entrant portion 24 is a mounting bracket 23 which carries an electrical terminal strip 25. A pair of conventional microswitches 26' having actuating plungers 27 are also fixedly attached to the re-entrant portion 24.

The control rod extension 5 passes coaxially through the drive shaft 8', re-entrant portion 24, and an accommodating hole in the bracket 23, and terminates at its top in an adjustably positioned circular switch actuator plate 6'. The actuator plate 6' carries, in screw threaded relationship therewith, a pair of adjustable switch actuator screws 28 in a position to engage, respectively, the pair of microswitch actuating plungers 27. Alignment between actuator screws 28 and actuating plungers 27 is maintained by a pair of screws 29 (Figure 3) which pass through accommodating holes drilled in the actuator plate 6' and are threaded into the bracket 23.

Engaging the bottom of the actuator plate 6', and slidable within the re-entrant portion 24, is a hollow spring retaining collar 34. The compression spring 9 is positioned around the control rod extension 5 with its upper end bearing against the collar 34 and its lower end bearing against the adjusting sleeve 22. Thus, the spring 9 operates to urge the actuator plate 6' and the actuator screws 28 upwardly with respect to the drive shaft 8', the switch housing 7', and the microswitches 26'. The weight of the control rod extension 5 (and the control rod 2 when the control rod is supported by the extension) tends to counteract the spring force and pull the actuator plate 6' downwardly relative to the switch housing 7'.

Figure 4:
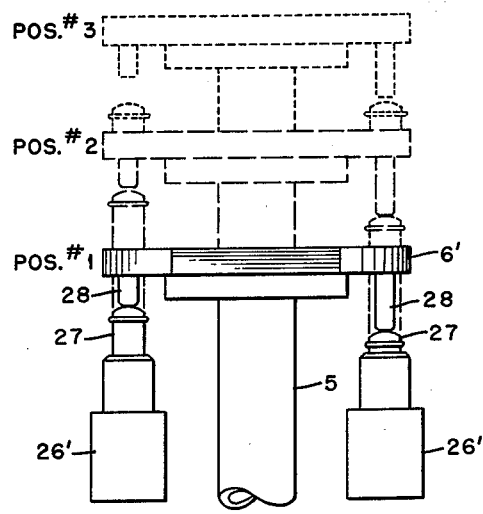
Figure 4 is a schematic representation of the actuation of the switching means under each of the three possible operative conditions of the Figure 1 embodiment.

Figure 4 illustrates schematically the relative positions of the microswitch actuating plungers 27 and the actuator screws 28 corresponding to the three possible operative conditions of the control rod 2 and control rod extension 5. In order to obtain differential operation of the two microswitches under different operative conditions, the two actuator screws 28 are pre-adjusted to different positions, that is, the right hand actuator screw (in Figure 4) has been threaded down farther than the left hand actuator screw, such that there exists a position, designated as position No. 2 and shown in long dash lines wherein the left hand microswitch is not actuated and the right hand microswitch is actuated. The control rod extension 5 and the actuator plate 6' will assume this position No. 2 when the load upon spring 9 consists solely of the weight of the control rod extension 5, that is, when the control rod 2 is disengaged from the extension 5 and is being supported by the reactor structure. When the drive shaft 8' is lowered to a point where the control rod extension 5 is resting upon and being supported by the control rod 2, the switching means assumes its No. 3 position, wherein, as indicated in Figure 4 in short dash lines, neither microswitch is actuated. In the operative condition wherein the control rod 2 and control rod extension 5 are both being supported from the drive shaft 8', via the spring interconnection, the switching means assumes its No. 1 position in which both microswitches 26' are actuated, as indicated in Figure 4 in solid lines. Thus, there exist three different combinations of actuation of the pair of microswitches 26', each combination corresponding to one of the three numbered positions, and to one of the three possible operative conditions of the control rod 2 and control rod extension 5. In position No. 1, both microswitches are actuated; in position No. 2, only the right hand microswitch is actuated; and in position No. 3, neither microswitch is actuated.

Referring now to the embodiment of Figures 5–7, the housing 7" in this case is fixedly attached to the lower end of the drive shaft 8" exactly as in the schematic representation of Figure 8. Housing 7" is divided by the circular dividing member 41 into an upper chamber 42 housing the pair of microswitches 26" and a lower chamber 43 housing the actuator plate 6". An enlarged rectangular extension 44 of the drive shaft 8" passes through the upper chamber 42 to the circular dividing member 41 to which it is fixedly attached. The pair of microswitches 26" are attached by screws to opposite sides of the rectangular extension 44. The drive shaft 8" will be understood to be connected to be driven from a suitable drive motor by way of a conventional rack and pinion arrangement, or a pulley system, or other suitable drive apparatus.

Slidably movable within the lower chamber 43 of housing 7" is the switch actuator plate 6", this plate being fixedly attached to the control rod extension 5 for vertical movement therewith. The control rod extension 5 passes through an accommodating hole in bottom plate 10" of housing 7". The compression spring 9 is positioned within an annular recess in actuator plate 6" so that its upper end bears against the lower surface of the recess and its lower end bears against the upper surface of the bottom plate 10". The compression spring 9 thus urges the actuator plate 6" upwardly relative to the housing 77", as in the other embodiments of the invention.

A pair of elongated actuator rods 45 are adjustably threaded into a pair of tapped holes on opposite sides of the actuator plate 6". The rods 45 pass upwardly through accommodating holes drilled in opposite sides of the dividing member 41, into the upper chamber 42, where they terminate in conical ends 49. The microswitches 26" are adapted to have their actuating plungers 46 depressed by the leaf spring brackets 47. Brackets 47 pivotally support rollers 48 which are aligned over the actuator rods 45 such that when these rods move upwardly sufficiently, they engage the rollers 48, thus depressing the leaf spring brackets 47 and the plungers 46 and actuating the microswitches 26". Bottom plate 10" has two holes 50 drilled in opposite sides thereof and aligned with rods 45 to permit access to the lower ends of rods 45 for adjustment of their positions vertically of the actuator plate 6".

For purpose of clarity, the microswitches 26" have been omitted in Figure 5, and the rods 45 have been shown rotated in Figure 5 approximately 43½° from their true positions corresponding to that shown in Figure 6. The true position of the rods 49 is indicated by dash lines in Figure 5.

As schematically indicated in Figure 7, the embodiment of Figures 5–7 operates in much the same manner as the previously described embodiment of Figures 1–4, the designated positions No. 1, No. 2, and No. 3 corresponding to the same operative conditions of control rod and extension in the two embodiments. In order to obtain the differential operation of the two microswitches under various operative conditions, the right hand actuator rod 45 is initially threaded farther upwardly in the actuator plate 6" than the left hand rod, such that in the No. 2 position, the left hand microswitch is not actuated and the right hand microswitch is actuated, as schematically indicated by long dash lines in Figure 7. In position No. 1 neither microswitch is actuated, as indicated by solid lines in Figure 7, and in position No. 3 both microswitches are actuated, as indicated by short dash lines in Figure 7.

Since many changes could be made in the above described apparatus, and many apparently widely different embodiments of this invention could be made without department from the principles thereof, it is intended that all matter contained in the above description, or shown in the accompanying drawings, shall be interpreted as illustrative and not in a limiting sense.

What is claimed is:

1. In a neutronic reactor control system, in combination, a vertically elongated control rod adapted to be variably inserted into a neutronic reactor and having a lowermost position wherein it is supported within and by the reactor, a control rod extension disposed above said control rod and engageable therewith, electromagnetic means forming a releasable coupling between said control rod and said extension, a vertically movable drive shaft, a spring interconnecting said extension and said drive shaft whereby said extension is normally supported from said drive shaft through said spring, motive means for controlling the vertical position of said drive shaft, and three position electrical switching means actuatable by relative vertical movement of said extension with respect to said drive shaft, said spring being of such strength that the weight of said extension and said control rod together causes said switching means to assume the first of its three positions, the weight of said extension alone causes said switching means to assume the second of its three positions, and the absence of any weight load on said spring causes said switching means to assume the third of its three positions.

2. Apparatus as claimed in claim 1, wherein said drive shaft comprises a hollow shaft coaxial with said extension.

References Cited in the file of this patent

UNITED STATES PATENTS

| 703,713 | Smith et al. | July 1, 1902 |
| 1,179,486 | Wight | Apr. 18, 1916 |

OTHER REFERENCES

AECD–3435, AEC document declassified 1952, page 12.

Research Reactors (TID–5275), U.S. Gov't Printing Office (1955), pages 168, 171, 324, 325.

Schultz: "Control of Nuclear Reactors and Power Plants," McGraw-Hill Book Co., New York (1955), pages 114, 119.

UNITED STATES PATENT OFFICE

CERTIFICATE OF CORRECTION

Patent No. 2,917,445                         December 15, 1959

Lester C. Oakes et al.

It is hereby certified that error appears in the printed specification of the above numbered patent requiring correction and that the said Letters Patent should read as corrected below.

Column 3, line 11, after "electromagnet" strike out "finding" and insert instead -- winding --; column 4, line 20, after "shaft" insert -- 8' --; line 24, for "plate 10." read -- plate 10' --; column 5, line 51, for "housing 77"" read -- housing 7" --.

Signed and sealed this 5th day of July 1960.

(SEAL)

Attest:
KARL H. AXLINE
Attesting Officer

ROBERT C. WATSON
Commissioner of Patents